United States Patent
Li

(10) Patent No.: US 9,148,242 B2
(45) Date of Patent: Sep. 29, 2015

(54) METHOD AND DEVICE FOR DETECTING FAULT OF SIGNAL PROCESSING EQUIPMENT AND OPTICAL INTERFACE BOARD ONLINE

(75) Inventor: Pu Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 667 days.

(21) Appl. No.: 13/258,415

(22) PCT Filed: May 28, 2010

(86) PCT No.: PCT/CN2010/073356
§ 371 (c)(1),
(2), (4) Date: Dec. 14, 2011

(87) PCT Pub. No.: WO2010/145438
PCT Pub. Date: Dec. 23, 2010

(65) Prior Publication Data
US 2012/0089351 A1   Apr. 12, 2012

(30) Foreign Application Priority Data

Jun. 19, 2009   (CN) .......................... 2009 1 0108209

(51) Int. Cl.
*H04J 3/14* (2006.01)
*H04B 10/077* (2013.01)
(Continued)

(52) U.S. Cl.
CPC .............. *H04J 3/14* (2013.01); *H04B 10/0779* (2013.01); *H04L 41/0677* (2013.01); *H04J 2203/006* (2013.01)

(58) Field of Classification Search
CPC ... H04B 10/0779; H04L 41/0677; H04J 3/14; H04J 2203/006
USPC .......................................................... 702/58
See application file for complete search history.

(56) References Cited

U.S. PATENT DOCUMENTS 5,150,243 A * 9/1992 Suzuki ............................ 398/17
5,390,326 A * 2/1995 Shah .............................. 370/222

FOREIGN PATENT DOCUMENTS

CN        1791007 A     6/2006
CN      101145970 A     3/2008
(Continued)

OTHER PUBLICATIONS

Electrical Circuit Diagnosis—Course 623, Section 2, Toyota Technical Training, 74 p., 2007, http://www.autoshop101.com/forms/elec02.pdf.*

(Continued)

*Primary Examiner* — Alexander Satanovsky
(74) *Attorney, Agent, or Firm* — Oppedahl Patent Law Firm LLC

(57) ABSTRACT

The disclosure relates to a method and device for detecting a fault of signal processing equipment and an optical interface board on line. The signal processing equipment includes n function modules F1, F2, ... Fn, and n fault detecting points T1, T2, ... Tn for determining whether there is a fault in said n function modules, wherein n is a natural number. When the detecting result of said detecting point Ti indicates there is a fault in the function module Fi, the corresponding detecting points of other function modules directly associated with the function module Fi are detected continuously, and the reason of the fault is determined according to all the fault function modules. The present disclosure divides the equipment or the board into different modules in accordance with functions, a fault detecting point being set in each module. Therefore, the fault source point of the equipment or the board can be detected and located quickly without artificial participation, and the self-detection can be done automatically when the board is idle to detect problems promptly, so as to improve the testability and the on-site maintainability of products.

1 Claim, 4 Drawing Sheets

(51) Int. Cl.
*H04L 12/24* (2006.01)
*H04J 14/08* (2006.01)

(56) References Cited

FOREIGN PATENT DOCUMENTS

| CN | 101325517 A | 12/2008 |
|---|---|---|
| CN | 101594192 A | 12/2009 |
| JP | H09107341 A | 4/1997 |
| JP | 2001016296 A | 1/2001 |
| JP | 2002125006 A | 4/2002 |
| JP | 2006270848 A | 10/2006 |
| JP | 2007124057 A | 5/2007 |
| JP | 4192651 B2 | 12/2008 |
| KR | 19990076360 A | 10/1999 |
| RU | 2207262 C1 | 6/2003 |
| RU | 2277065 C2 | 5/2006 |
| WO | 9107341 A1 | 5/1991 |
| WO | 03075206 A1 | 9/2003 |

OTHER PUBLICATIONS

International Search Report on international application No. PCT/CN2010/073356, mailed on Sep. 9, 2010.
English Translation of the Written Opinion of the International Search Authority in international application No. PCT/CN2010/073356, mailed on Sep. 9, 2010.

* cited by examiner

METHOD AND DEVICE FOR DETECTING FAULT OF SIGNAL PROCESSING EQUIPMENT AND OPTICAL INTERFACE BOARD ONLINE

TECHNICAL FIELD

The disclosure relates to the field of telecommunications, and in particular to a method and a device for detecting a fault of signal processing equipment and an optical interface board on line, specifically to a Built-In Test (BIT) method of an optical interface board in the equipment with optical Synchronous Digital Hierarchy (SDH).

BACKGROUND

As a fault of the optical network equipment may be occurred during the operation process, the rapid and effective fault location is very important for the customer and for improving the quality of the equipment. The most conventional fault location method is to inquire the running state of the board and make an alarm. In order to monitor the running state of the board, the support of the network management system is needed; when working abnormally, the board reports the fault to the network management system; then the network management system displays and alarms the maintainer. The relationship between the network management system and the SDH network element is shown by FIG. 1, wherein the SDH network element includes an optical interface board and other boards, and is controlled by a network element control board; the network manager monitors the running state of the SDH network element on a display of a server.

However, the network management system is only responsible for reporting and displaying the alarm of the fault rather than processing and analyzing the fault flexibly. That is to say, the specific fault source cannot be located automatically; the regular fault location steps are to determine gradually by workers and finally determine the fault source point by means of some loopbacks. Such artificial location method not only has slow speed, but sometime is also limited by the network management operating commands. The operable means and methods are limited; in particular, some location methods can only be finished by professionals. Therefore, troubles are made for the in-time fault location. Actually, the diagnosis process of the fault can be completely and automatically finished by the board without the artificial intervention. Here, it is called on-line fault diagnosis system which finishes the gradual fault determination on line through the board software and finally realizes the fault rapid detection and location functions, thereby bringing great convenience for the location of the fault. Besides the fault source point can be detected and located when the fault occurs, another advantage of such system is that the self-detection can be done automatically when the board is idle to detect problems promptly and isolate the fault point, so as to improve the testability and the on-site maintainability of products.

The emphasis of the method and the device for diagnosing the fault of the communication apparatus in relating technologies is to classify the faults, draw an alarm related chart; and finally the artificial operation is needed to analyze and locate the fault based on the contrast of the practical alarm and the alarm related chart.

There is another method for diagnosing a fault of a mobile communication terminal in the relating technologies, the emphasis of which is to record the condition of the occurrence in real time, but finally analyze the fault journal artificially.

There is a further method and device for self-diagnosing a fault in the relating technologies; the diagnosis system thereof needs a great database and a fault correlation analysis module, both of which cannot be integrated with the board software independently. In addition, the implementation is to diagnose the fault of the existing equipment, and such diagnosis has been limited by the alarm output state of the running equipment. If the design of the board has not considered the outputting of enough state information, the use of such method is also limited. Finally, the analysis can be done only when the equipment provide plenty of standard alarm information which has correlation; therefore, the fault location capability is limited.

SUMMARY

The purpose of this disclosure is to provide a method for on-line detecting a fault of signal processing equipment and an optical interface board, which can detect and locate the fault automatically so that the running condition of the board can be mastered in real time.

This disclosure discloses a method for on-line detecting a fault of signal processing equipment. The signal processing equipment includes n function modules F1, F2, . . . Fn, and n fault detecting points T1, T2, . . . Tn for determining whether there is a fault in said n function modules, wherein n is a natural number. The method comprises the follows: detecting the fault detection points one by one; when the detection result of a detection point Ti indicates there is a fault in the function module Fi, performing the detection on a corresponding detecting point of other function module directly associated with the function module Fi; finding all the function modules with fault; and ending the detection, wherein i is any natural number from 1 to n.

In the method for detecting, the step of detecting the fault detection points one by one may comprise the follows: detecting the fault detection point Tn firstly, wherein the fault detection point Tn is a detection point of the n fault detection points which has a greatest correlation with the faults of other function modules; if the detection result indicates there is no fault in the function module Fn, indicating that all the function modules of the signal processing equipment have no fault.

When the detection result of the detection point Ti indicates there is a fault in the function module Fi, the step of performing the detection on the corresponding detection points of the other function module directly associated with the function module Fi may comprise the follows: when the serial numbers of n function modules are associated with a stream direction of a signal and the signal in a function module Fi-1 flows to the function module Fi, performing the detection on a fault detection point Ti-1 of a function module Fi-1 if the detection result of the detection point Ti indicates there is a fault in the function module Fi.

The signal processing equipment may be an optical interface board in optical synchronous digital hierarchy equipment.

This disclosure further discloses a method for on-line detecting a fault of an optical interface board. The optical interface board includes an optical module F1 and a fault detection point T1 thereof, a clock module F2 and a fault detection point T2 thereof, a multiplexing and de-multiplexing module F3 and a fault detection point T3 thereof, a service processing module F4 and a fault detection point T4 thereof; and the method comprises the follows:

detecting the fault detection point T4 of the service processing module F4 firstly; if there is no fault, indicating that the optical interface board has no fault and ending the detection;

if the detection for the fault detection point T4 indicates there is a fault in the service processing module F4, performing the detection on the fault detection point T3 of the multiplexing and de-multiplexing module F3; if there is no fault detected at T3, indicating that the fault is only in the service processing module F4 of the optical interface board; and ending the detection;

if the detection of the fault detection point T3 indicates there is a fault in the multiplexing and de-multiplexing module F3, performing the detection on the fault detection point T2; if there is a fault detected at T2, indicating that there is a fault in the clock module F2 of the optical interface board or there is a fault in the clock module F2, the multiplexing and de-multiplexing module F3 and the service processing module F4 of the optical interface board; and ending the detection;

if the detection of the fault detection point T2 indicates there is no fault in the clock module F2, performing the detection on the fault detection point T1; if there is no fault detected at T1, indicating that there is a fault in the multiplexing and de-multiplexing module F3 of the optical interface board; if there is a fault detected at T1, indicating that the fault of the optical interface board comes from the optical module F1 or an upper stream; and ending the detection; and if the detection of the fault detection points T2 and T3 indicates there is a fault in the clock module F2 and there is no fault in the multiplexing and de-multiplexing module F3, performing the detection on the fault detection point T1; if there is no fault detected at T1, indicating that there is a fault in the service processing module F4 and the multiplexing and de-multiplexing module F2 of the optical interface board; if there is a fault detected at T1, indicating that the fault of the optical interface board comes from the upper stream; and ending the detection.

The disclosure further discloses a device for on-line detecting a fault of signal processing equipment. The signal processing equipment includes n function modules F1, F2, . . . Fn, and n fault detecting points T1, T2, . . . Tn for determining whether there is a fault in said n function modules, wherein n is a natural number. The device comprises:

a fault detection module configured to acquire a state of the fault detection point in the signal processing equipment;

a fault determination module configured to: determine whether there is a fault in a corresponding function module based on the state of the fault detection point; and a detection management module configured to: control the detection module and the fault determination module; when the fault determination module indicates there is a fault in a function module Fi, control the fault detection module to carry on acquiring a state of a corresponding detection point of other function module directly associated with the function module Fi and send the state to the fault determination module for the determination until all the function modules with fault are detected and the fault reasons are determined.

The detection management module may be further configured to: select a fault detection point Tn in the n fault detection points which has a greatest correlation with the faults of other function modules; control the fault detection module and the fault determination module to firstly detect the fault detection point Tn having greatest correlation with the fault; if the fault determination module determines there is no fault in the corresponding function module Fn, determine that there is no fault in all the function modules of the signal processing equipment; and end the detection.

When the serial numbers of the n function modules are associated with a stream direction of the signal and the signal in a function module Fi-1 flows to the function module Fi, and if the fault determination module determines the state of the fault detection point Ti acquired by the fault detection module to indicate there is a fault in the function module Fi, the detection management module is configured to control the fault detection module and the fault determination module to perform the detection on the function module Fi-1 until all the function modules with the fault has been detected.

The device for detecting is a component of the signal processing equipment.

The method for on-line detecting the fault of the signal processing equipment and the optical interface board disclosed by this disclosure is to divide the equipment or the board into different modules in accordance with the function; each module is provided with corresponding fault detection point; the fault source point of the equipment or the board can be detected and located rapidly without artificial participation; and self-detection can be done automatically when the board is idle to detect problems promptly, so as to improve the testability and the on-site maintainability of products. The device for automatically on-line diagnosing a fault disclosed by this disclosure is an independent software detection module which can be integrated with the software module at normal state of the board, and the detection is performed by an operating system and is easy to realize.

DETAILED DESCRIPTION

A further detailed description is made for the disclosure by combining with the following figures and specific implementation ways.

The disclosure includes three parts as follows: analysis and establishment of board alarm correlation, establishment of a fault dictionary, and establishment of a detection software module.

Firstly, analysis and establishment of board alarm correlation includes that: dividing the board at the designing stage into different modules in accordance with functions, wherein each module should have a respective fault detection point. The module division needs to be according to certain basis; that is to say, there is a certain logic relationship between a function module and a fault detection point, between two function modules or between two fault detection points. For example, if the fault detection point Ti depends on the function module Fi, there is a fault in the function module Fi when the test result of the fault detection point Ti is abnormal. In contrast, if the fault detection point Ti passes through the detection, it proves that the function module Fi is normal, that is say, the fault detection point Ti is associated with the function module Fi. Meanwhile, the function module Fi+1 also depends on the function module Fi, and if the detection point Ti of the function module Fi is abnormal, it is possible to detect that the detection point Ti+1 of the function module Fi+1 is abnormal, which indicates the function module Fi is associated with the function module Fi+1. Finally, providing that only one function module has problem at the same moment, said method can be used for diagnosing the problems one by one when there are problems in multiple function modules at the same time.

The division of the module may be on basis of the stream direction of the signal of the signal processing equipment.

Figure 1:
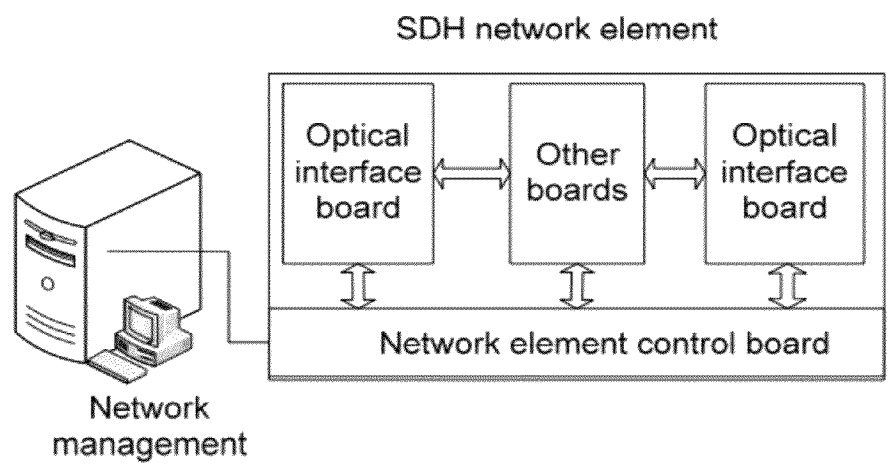
FIG. 1 shows a schematic diagram of a relationship between an SDH network element and a network management system.
Figure 2:
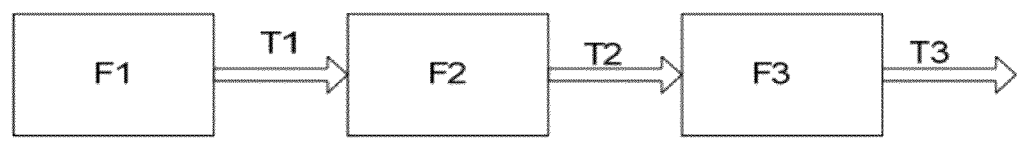
FIG. 2 shows a schematic diagram of the correlation between function modules and fault detection points of the disclosure.

The relationship between the function module and the detection point is shown in FIG. 2; the function module F1, the function module F2 and the function module F3 are connected in sequence; the detection point of the function module F1 is T1; the detection point of the function module F2 is T2; and the detection point of the function module F3 is T3.

Secondly, establishing the fault dictionary based on the result of the alarm correlation analysis, wherein a function module Fi is set as a lengthwise coordinate and a fault detection point Ti is set as a transverse coordinate so as to form a two-dimensional matrix. All the rows in each column are added so that a fault correlation R can be obtained; the preferential detection point is the one with maximum value of the fault correlation R; during the establishment of the fault dictionary, in order to bring convenience for the following writing of a fault detection software, the serial number of the modules can be adjusted suitably so that the function module with greatest serial number corresponds to the item with the maximum value of the fault correlation R; thus, in the process for determining the preferably detected detection point, the detection point of the function module with greatest serial number is the preferential detection point. If there is no fault at the preferential detection point, there is no fault in the whole board.

Figure 3:
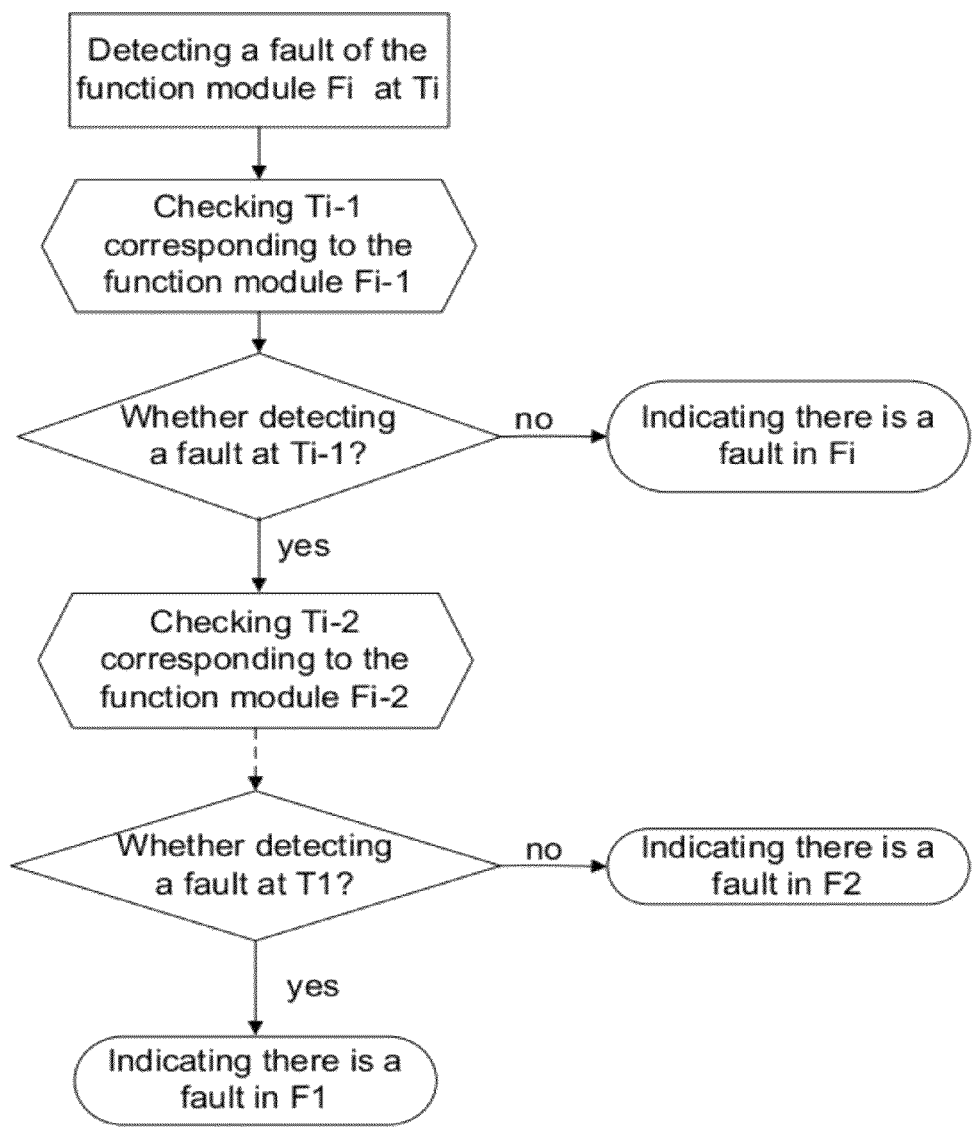
FIG. 3 shows a flowchart of a method for determining a fault source point by a software detection module.

Thirdly, perfecting board software based on the fault dictionary by establishing a software detection module, wherein different task modules of the board software structure are called by adopting an operating system, the software detection module is performed at the idle state of each level of CPU and is a task module with lowest priority. The working process of the software detection module is as follows: when there is a faulted Ti in the current level Fi, checking the fault detection point Ti-1 of the former level Fi-1 firstly; if there is no fault, indicating that the fault is at the current Fi; if there is a fault, checking the fault detection point Ti-2 of the Fi-2 level, and so forth, finally finding the source of the fault. The flowchart of the method for specifically determining the fault source by the software detection module is shown in FIG. 3.

Figure 4:
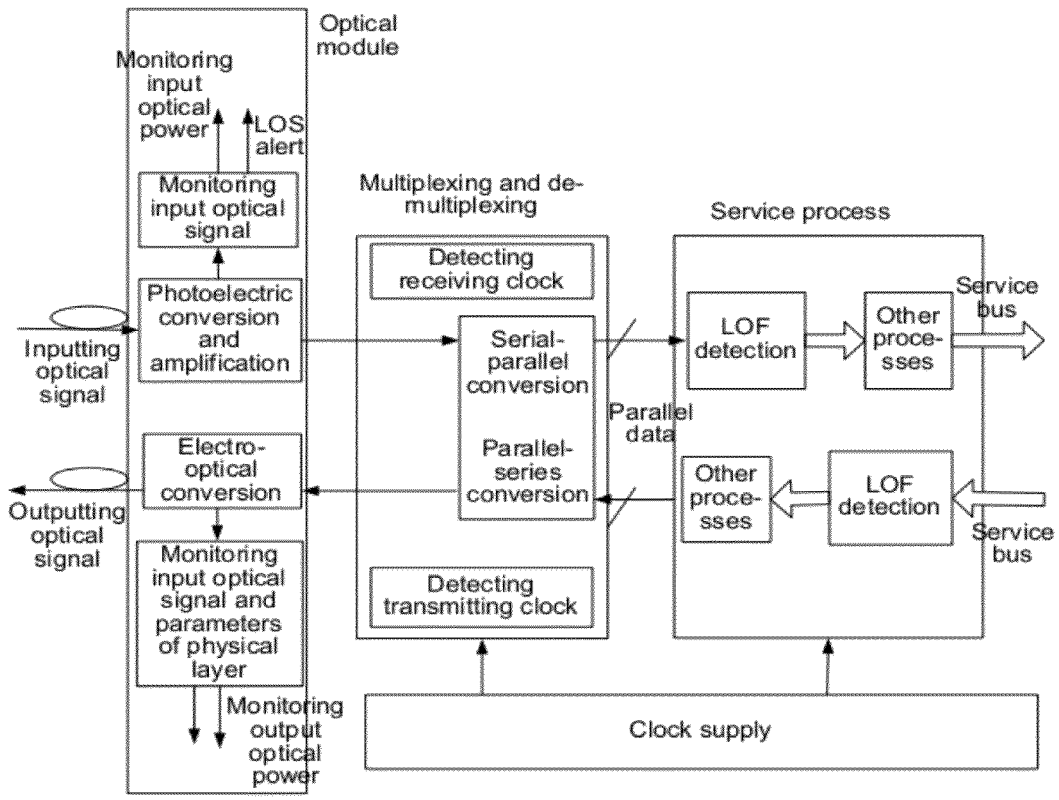
FIG. 4 shows a schematic diagram of a working principle of an optical interface board in an optical communication system.

FIG. 4 is a block diagram of a working principle of a service stream of an optical interface board in an optical communication system; the signal entering into the optical board is firstly subjected from the photoelectric conversion by an optical module to get a serial high-speed electric signal; the serial high-speed electric signal is decomposed into multiple paths of a low-speed parallel signal by a multiplexing and de-multiplexing module; then the signal are sent to the service processing module for the corresponding process and finally the processed service is sent to other function boards through a service bus. Similarly, the services from the other function boards through the service bus and after the detection and other processes by the service processing module are sent into the multiplexing and de-multiplexing module in parallel, and then are input into the optical module after the parallel-series conversion so as to output the optical signals after the electro-optical conversion. The clock supply module provides a clock signal to the multiplexing and de-multiplexing module. The detection point in the optical interface board shown in FIG. 4 includes input optical signal detection, receiving clock detection, transmitting clock detection and output optical signal detection.

Figure 5:
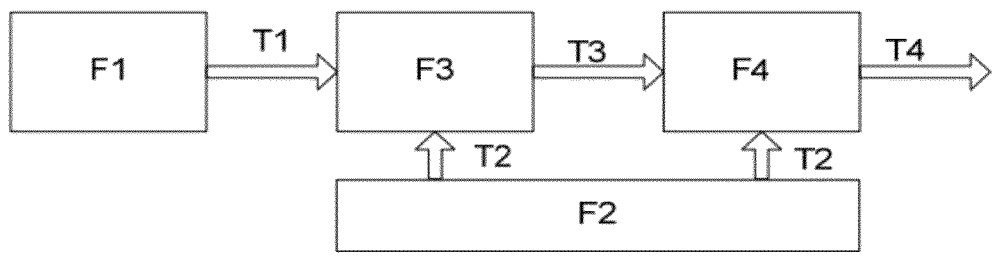
FIG. 5 shows a block diagram of function modules and fault detection points of an optical interface board for the alarm correlation analysis.

The optical interface board shown in FIG. 4 is divided into four parts in accordance with the functions: an optical module F1, a clock module F2, a multiplexing and de-multiplexing module F3, and a service processing module F4; the correspondingly detection points are respectively T1, T2, T3 and T4; and FIG. 5 shows the block diagram of the function module and the fault detection point used for the alarm correlation analysis on the optical interface board.

In accordance with the division result of the function modules, if a fault source point of the board is to be detected due to Loss Of Frame (LOF), for the fault detection point T1 of the optical module F1, its detection result is that the input optical power exceeds the threshold (the input optical power is higher than the maximum threshold); for the fault detection point T2 of the clock module F2, its detection result is PLL (Phase-Locked Loop) loss of lock; for the fault detection point T3 for the multiplexing and de-multiplexing module F3, its detection result is that the receiving clock is unlocked; for the fault detection point T4 of the service processing module F4, its detection result is LOF. If a fault source point is to be detected due to Loss Of Signal (LOS), for the fault detection point T1 of the optical module F1, its detection result is LOS of the optical module; for the fault detection point T2 of the clock module F2, its detection result is the loss of the clock for the phase-locked loop; for the fault detection point T3 of the multiplexing and de-multiplexing module F3, its detection result is LOS of multiplexer; for the fault detection point T4 of the service processing module F4, its detection result is LOS of the service.

The fault dictionary established according to the result of said correlation analysis is as follows:

| Function modules and detection points | T1 | T2 | T3 | T4 |
|---|---|---|---|---|
| F1 | 1 | 0 | 1 | 1 |
| F2 | 0 | 1 | 1 | 1 |
| F3 | 0 | 0 | 1 | 1 |
| F4 | 0 | 0 | 0 | 1 |
| Fault correlation R | 1 | 1 | 3 | 4 |

The descriptions of 1 and 0 in the table above are as follows: if there is a fault in F1, it will detect a fault at each detection point of T1, T3 and T4, their corresponding coordinates are 1, and there is no fault at T2 and its corresponding coordinate is 0; if there is a fault in F2, there is no fault at T1, and there will detect a fault at each detection point of T2, T3 and T4, and thus the coordinate of the F2 corresponding to T1 is 0, and the coordinates of the F2 corresponding to T2, T3 and T4 are 1; if there is a fault only in F3, there is no fault detected at T1 and T2, and there will detect a fault only at detection points T3 and T4; if there is a fault in F4, there is no fault detected at T1, T2 and T3, and there will detect a fault at T4.

The determination of the preferential detection point is as follows: adding all rows in each corresponding column of said table to obtain the fault correlation R; regarding the point with the maximum R as the preferential detection point; for example, if the addition result of the first column is 1, the addition result of the second column is 1, the addition result of the third column is 3, and the addition result of the fourth column is 4, then the T4 is selected as the preferential detection point (namely the first detection point) according to the strongest correlation with other function modules, that is to say, according to the principle with biggest fault occurrence possibility. The software module writes the software detection module based on the fault dictionary in such way: only detecting T4 by a detection module when the fault detection is started; if there is no fault detected at T4, indicating that there is no fault in the four function modules on the service stream of the whole unit; once there is a fault detected at T4, indicating there is a fault at F4 or there is a fault possibly in F2 and F3 associated with F4; thus, detecting whether there is a fault at T3 firstly; if not, indicating that that there is no fault in F2 as F2 provides a clock signal to F3 and F4, and indicating there is a fault only in F4; in contrast, if there is a fault at T3, detecting T as the fault of F2 will be brought to both F3 and F4, if there is a fault detected at T2, indicating there is a fault in F2; if there is no fault at T2, detecting F1; if there is a fault detected at T1, indicating that the fault is possibly from F1 or the upper stream; in contrast, if there is not a fault detected at T1, indicating there is a fault in F3.

Figure 6:
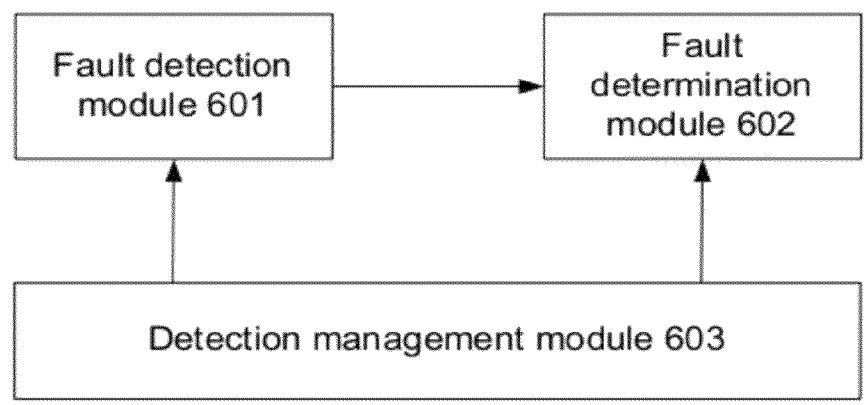
FIG. 6 shows a structural diagram of an on-line fault detection device of this disclosure.

FIG. 6 is the structural diagram of the on-line fault detection device of the disclosure, the device comprises:

a fault detection module 601 configured to acquire a state of the fault detection point in the signal processing equipment;

a fault determination module 602 configured to determine whether there is a fault in a corresponding function module based on the state of the fault detection point; and a detection management module 603 configured to: control the detection module 601 and the fault determination module 602; when the fault determination module 602 indicates there is a fault in a function module Fi, control the fault detection module 601 to carry on acquiring a state of a corresponding detection point of other function module directly associated with the function module Fi and send the state to the fault determination module 602 for the determination until all the function modules with fault are detected and the fault reasons are determined.

The detection management module 603 is further configured to: select a fault detection point Tn in the n fault detection points which has a greatest correlation with the faults of other function modules; control the fault detection module 601 and the fault determination module 602 to firstly detect the fault detection point Tn having greatest correlation with the fault; if the fault determination module 602 determines there is no fault in the corresponding function module Fn, determine that there is no fault in all the function modules of the signal processing equipment; and end the detection.

When the serial numbers of the n function modules are associated with a stream direction of the signal and the signal in a function module Fi-1 flows to the function module Fi, and if the fault determination module 602 determines the state of the fault detection point Ti acquired by the fault detection module 601 to indicate there is a fault in the function module Fi, the detection management module 603 is configured to control the fault detection module and the fault determination module to perform the detection on the function module Fi-1 until all the function modules with the fault has been detected.

The device for detecting is a component of the signal processing equipment.

As mentioned above, the method can detect and locate the fault source point rapidly without artificial participation and carry out self-detection automatically when the board is idle to detect faults promptly and isolate the fault point, so as to improve the testability and the on-site maintainability of products.

INDUSTRIAL APPLICABILITY

The method for on-line detecting a fault of the signal processing equipment and the optical interface board disclosed by this disclosure is to divide the equipment or the board into different modules in accordance with the function; each module is provided with corresponding fault detection point; the fault source point of the equipment or the board can be detected and located rapidly without artificial participation; and self-detection can be done automatically when the board is idle to detect problems promptly, so as to improve the testability and the on-site maintainability of products. The device for automatically on-line diagnosing a fault disclosed by this disclosure is an independent software detection module which can be integrated with the software module at normal state of the board, and the detection is performed by an operating system and is easy to realize.

What is claimed is:

1. A method for on-line detecting a fault of an optical interface board by an on-line fault detection device, the optical interface board comprising an optical module F1 and a fault detection point T1 thereof, a clock module F2 and a fault detection point F2 thereof, a multiplexing and de-multiplexing module F3 and a fault detection point T3 thereof, a service processing module F4 and a fault detection point F4 thereof; and the method comprising:

detecting a voltage of an electrical signal at the fault detection point T4 of the service processing module F4 firstly; if there is no fault, indicating that the optical interface board has no fault and ending the detection;

if the detection for the fault detection point T4 indicates the electrical signal is lost, i.e., there is a fault in the service processing module F4, performing the detection on a voltage of a clock signal at the fault detection point T3 of the multiplexing and de-multiplexing module F3; if there is no fault detected at T3, indicating that the fault is only in the service processing module F4 of the optical interface board; and ending the detection;

if the detection of the fault detection point T3 indicates the clock signal losses lock, i.e., there is a fault in the multiplexing and de-multiplexing module F3, performing the detection on a voltage of a Phase-Locked Loop (PLL) at the fault detection point T2; if it is detected at T2 that the PLL loses lock, i.e., there is a fault detected at T2, indicating that there is a fault in the clock module F2 of the optical interface board or there is a fault in the clock module F2, the multiplexing and de-multiplexing module F3 and the service processing module F4 of the optical interface board; and ending the detection;

if the detection of the fault detection point T2 indicates there is no fault in the clock module F2, performing the detection on an optical power of an optical signal at the fault detection point T1; if there is no fault detected at T1, indicating that there is a fault in the multiplexing and de-multiplexing module F3 of the optical interface board; if it is detected at T1 that the optical power exceeds a maximum threshold, i.e., there is a fault detected at T1, indicating that the fault of the optical interface board comes from the optical module F1 or an upper stream; and ending the detection;

if the detection of the fault detection points T2 and T3 indicates there is a fault in the clock module F2 and there is no fault in the multiplexing and de-multiplexing module F3, performing the detection on the fault detection point T1; if there is no fault detected at T1, indicating that there is a fault in the service processing module F4 and the multiplexing and de-multiplexing module F2 of the optical interface board; if there is a fault detected at T1, indicating that the fault of the optical interface board comes from the upper stream; and ending the detection.

* * * * *